Aug. 28, 1951 P. SCHLUMBOHM 2,566,035
CARAFE-LIKE KETTLE WITH INSULATED HANDLE, VENT MEANS
IN SAID HANDLE, AND SPOUTLESS POURING OPENING
Filed Dec. 9, 1947 2 Sheets-Sheet 1
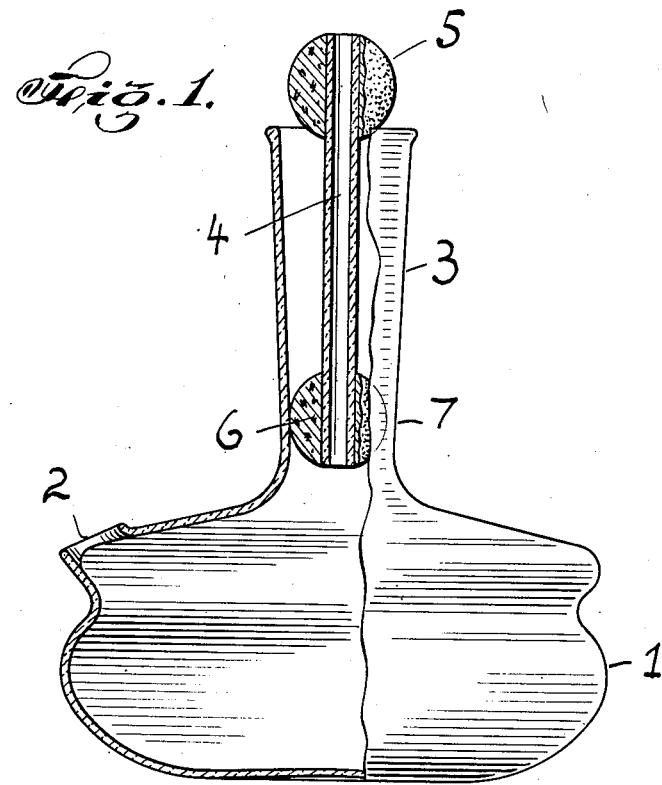
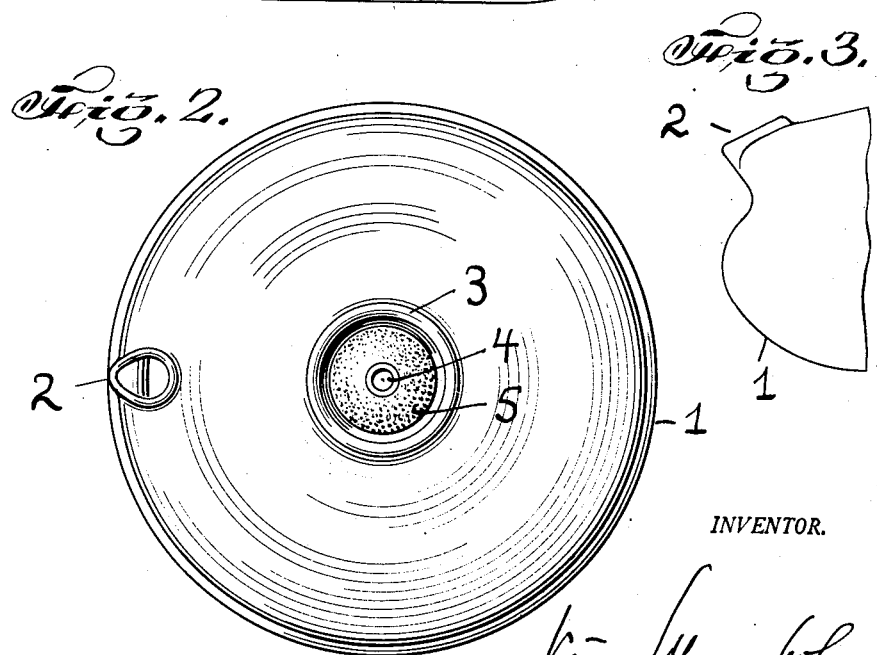
INVENTOR.

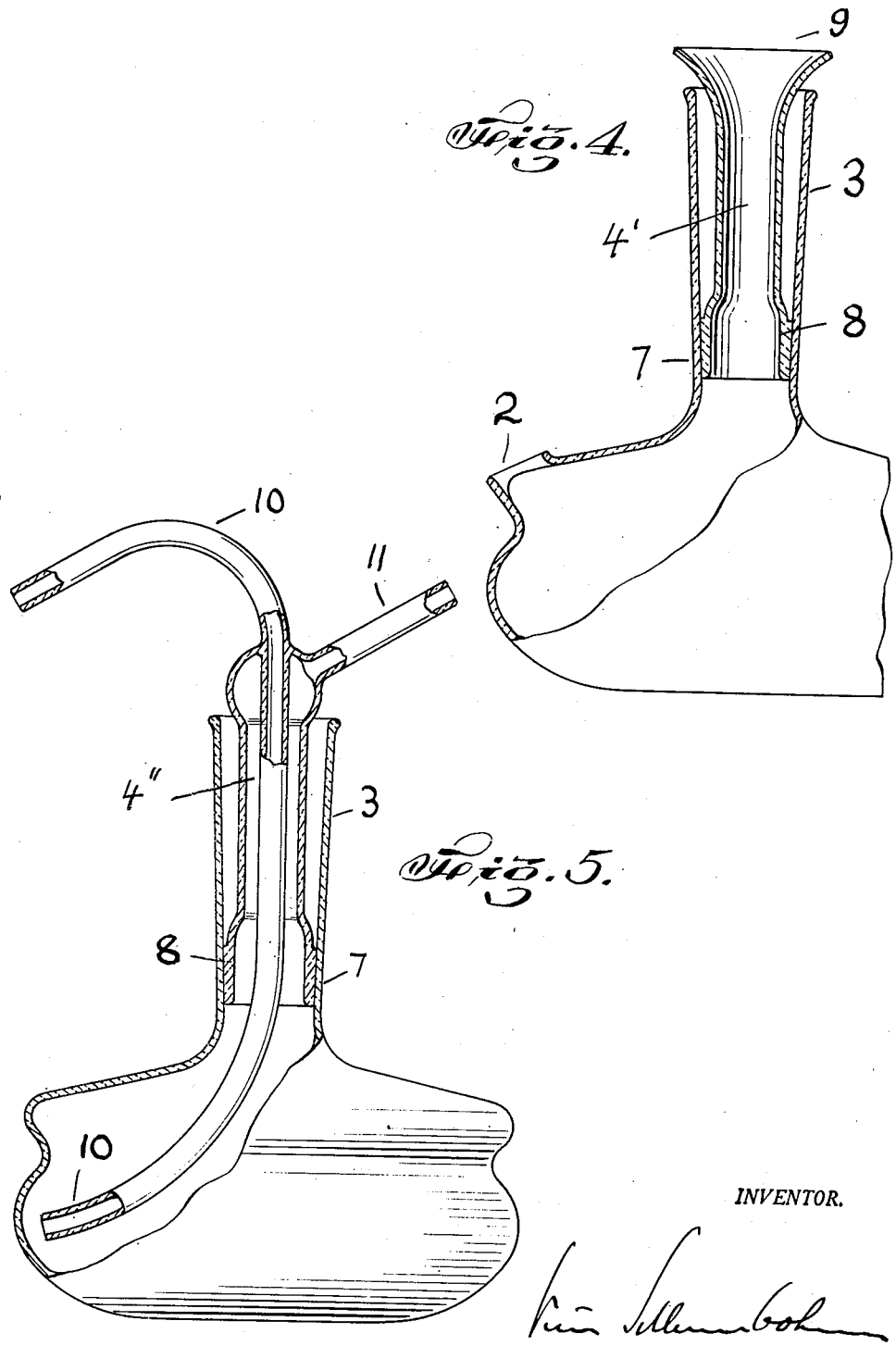

Patented Aug. 28, 1951

2,566,035

UNITED STATES PATENT OFFICE 2,566,035

CARAFELIKE KETTLE WITH INSULATED HANDLE, VENT MEANS IN SAID HANDLE, AND SPOUTLESS POURING OPENING

Peter Schlumbohm, New York, N. Y.

Application December 9, 1947, Serial No. 790,483

6 Claims. (Cl. 222—478)

The invention relates to kettles, in which a liquid is heated and from which the heated liquid is dispensed by tilting the kettle. Such "teakettles" are in general use for boiling the water required for an infusion of tea or coffee.

More specifically, the invention refers to a teakettle made from glass.

When attempting to make a kettle from glass, the problem of dispensing the boiling water safely has to be solved by providing a pouring spout for pouring the water and a rather "cool" handle to grip the kettle for lifting it.

To provide a spout in the ordinary meaning of the word on a glass kettle is technically very difficult, as it involves the team work of several highly skilled glass blowers. Following the invention, part of the walls of the kettle are contoured in a spout profile. By a simple second operation—burning a hole with a flame into said contoured walls—a spoutless pouring opening is created, through which the liquid flows hydrodynamically "as if" through a spout.

Providing a handle in the ordinary sense of the word—a separate holder attached by mechanical means to the kettle—involves the general problem of shielding such a handle against the flame which heats the kettle. By inevitable abuse— forgetting a kettle on the stove, too high a flame— such handles become not only hot but even scorched.

Following the invention, the upper walls of the kettle are shaped, carafe-like, as a handle. Heat travels poorly within glass. The lower walls of the kettle, which are in contact with the boiling water do not send much heat into those upper walls, which are not in contact with the water. However, these upper walls would become equally hot by condensation of steam on their inner surface. The invention is: to avoid a condensation of steam at those walls which are to form the handle. This is effected by a steam stopper, which seals the space walled by those handle walls against the live steam of the kettle, but which— by means of a tube—still vents the kettle for pouring through the spout.

The invention is illustrated, by way of examples, in Figs. 1-5 of the accompanying drawings.

Fig. 1 shows a kettle in side-view, partly in view, partly in vertical section.

Fig. 2 is a top view of Fig. 1.

Fig. 3 is a view of a detail of Fig. 1.

Fig. 4 is a side view of a modified kettle similar to the one in Fig. 1, partly in view, partly in vertical section.

Fig. 5 is a side view of a different kettle, shown partly in view, partly in vertical section.

In Fig. 1, the glass kettle 1 is blown in glass in one integral piece in the general shape of a carafe, with three sections assigned to three purposes: the lowest section is the space for the water; the middle section is the zone of the spout profiled wall and of the opening 2 for pouring; and the upper section forms the handle and the filling tube 3. The handle is tapered, being widest at the open end. The steam stopper comprises a vent-tube 4, which carries at each end a ball 5, 6 of plastic cork. These balls are of slightly different diameter to cope with the variations of the inside diameter of a blown glass body. One of them will fit into the "bottle neck" 7 as a seal against steam and this will keep the walls of the handle 3 cool. The upper cork ball serves as a heat-insulating handle for gripping the steam stopper; tube 4 itself being hot by steam.

When pouring, the kettle is gripped at the handle 3 with the user's arm from the elbow to the hand being at an angle of 90° with a line drawn from the handle through the opening 2. With this gripping position the kettle may readily be tilted by swinging the kettle in the manner that a pendulum swings and the pouring process is carried out in a steady position.

As illustrated in Figs. 1-3 inclusive, the opening 2 is formed by burning a hole in the kettle 1 and tooling the walls forming the opening into a lip which cooperates with the profiled section of the walls of the glass kettle to create a flow condition, when pouring is effected from the kettle, corresponding to a flow condition which occurs in a kettle which incorporates an elongated spout.

The Figs. 4 and 5 illustrate a modification of the steam stopper. The vent tube 4' in Fig. 4 and 4'' in Fig. 5 seals the bottle neck 7 by means of an exchangeable ground joint 8, which is the male ground joint, with the inner surface of the bottle neck section 7 being ground as a female joint.

The modification shown in Fig. 4 is designed so that the steam stopper needs to be removed only occasionally for cleaning purposes. The upper end of the vent tube 4' forms a fill-in funnel 9 for filling the kettle with water.

The modification shown in Fig. 5 applies the invention to the creation of a laboratory "wash-flask" for washing chemicals on a filter with hot water. The water is lifted pneumatically by blowing into tube 11. The kettle, in this case, has no spout, and the water is driven by the air pressure of the lungs through tube 10, in a well known manner.

The integral spout and integral handle of the kettle are significant features. No doubt, the spoutless pouring opening may also be applied to materials other than glass. For instance, it solves the welding problem of aluminum ware by eliminating the necessity of welding on a special spout. On the other hand, the integral handle with the steam stopper is limited to materials with a low heat-conductivity factor such as glass, quartz, porcelain, ceramics or heat-resistant plastics.

Having now described the nature of my invention and having given examples of the manner in which it may be performed, I claim as my invention:

1. A carafe shaped kettle comprising a liquid containing portion with a pouring spout located at an intermediate portion thereon, an upper tubular portion integral with the liquid containing portion for use as a liquid intake for the kettle and as a handle for lifting the kettle, said tubular portion having a steam stopper inserted therein for preventing steam condensation and for conducting away hot vapors, said steam stopper comprising a vent tube, sealing means disposed around the vent tube and located at the lower end of the vent tube in contact with the tubular neck, and heat insulating means disposed around and located at the upper end of the vent tube.

2. A carafe shaped kettle formed of non-heat conducting material comprising a liquid containing portion, an upper elongated tubular neck portion integral with the liquid containing portion serving as a handle for lifting the kettle, said upper tubular neck portion having an inner tubular portion positioned therein serving as a vent tube for the steam formed in the kettle, and sealing means formed at the bottom of the inner tubular portion in contact with the elongated tubular neck portion.

3. A kettle as claimed in claim 2, wherein said inner tubular portion is formed with an insulating means disposed at its upper end.

4. A kettle as claimed in claim 2, wherein said inner portion is removable.

5. A kettle as claimed in claim 2, wherein the kettle is formed with an opening below the neck portion.

6. A kettle as claimed in claim 5, wherein the diameter of the kettle is reduced at a point below the level of the opening.

PETER SCHLUMBOHM.

REFERENCES CITED

The following references are of record in the file of this patent:

UNITED STATES PATENTS

| Number | Name | Date |
|---|---|---|
| 1,203,661 | Task | Nov. 7, 1916 |
| 2,241,368 | Schlumbohm | May 6, 1941 |
| 2,366,951 | Aycock | Jan. 9, 1945 |
| 2,503,308 | Wiener et al. | Apr. 11, 1950 |